Dec. 19, 1967   F. ZANKL ETAL   3,358,360
MACHINE TOOL WITH A TOOL CHANGER
Filed Oct. 4, 1966   4 Sheets-Sheet 2

INVENTORS
FRANK ZANKL &
THEODORE A. WETZEL
BY Cyril M. Hajewski
ATTORNEY

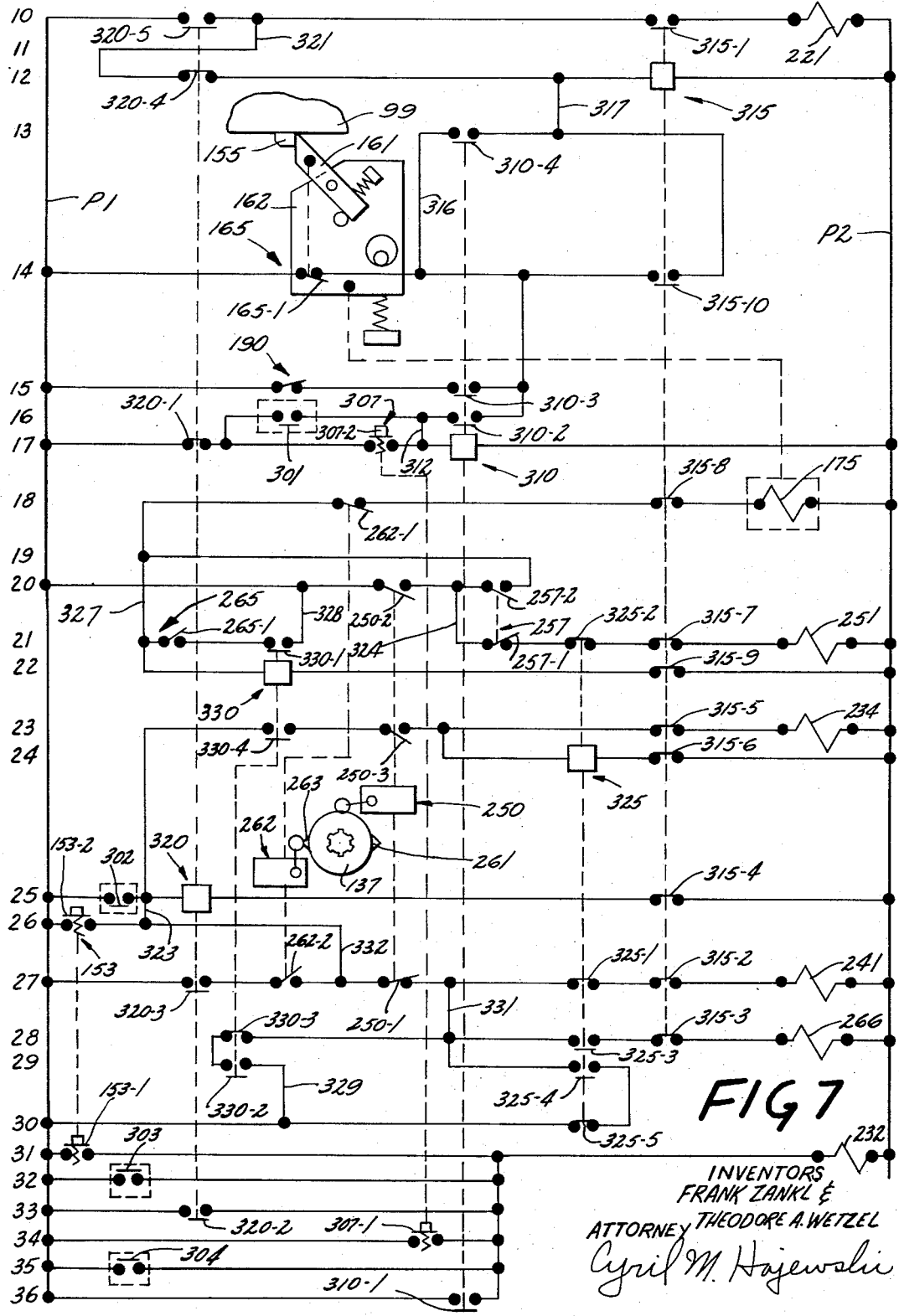

Dec. 19, 1967     F. ZANKL ETAL     3,358,360
MACHINE TOOL WITH A TOOL CHANGER
Filed Oct. 4, 1966                4 Sheets-Sheet 4
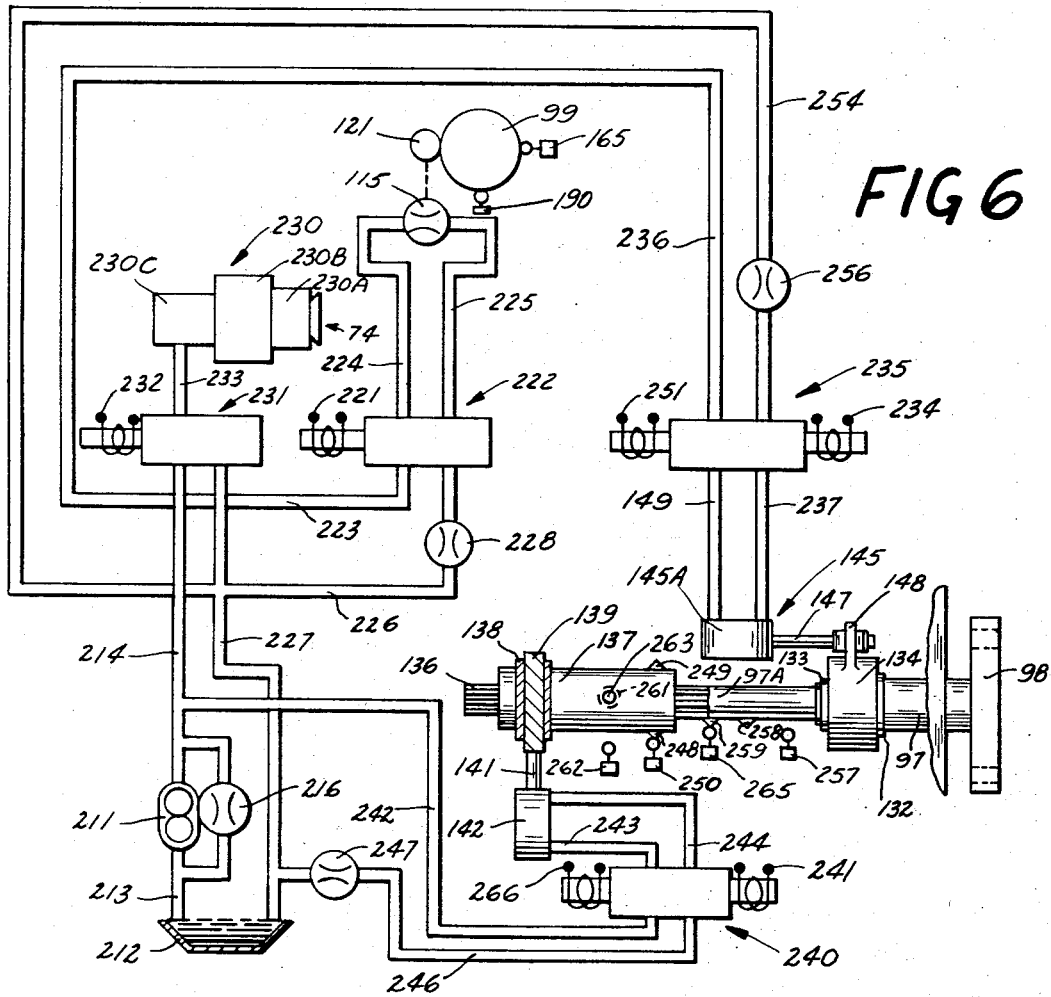
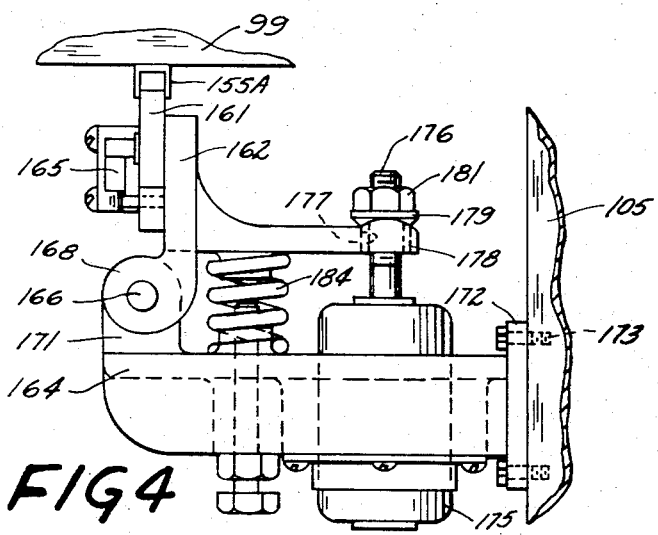
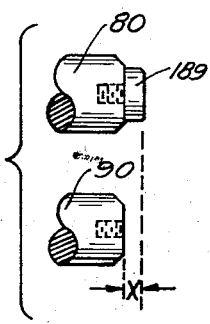
INVENTORS
FRANK ZANKL &
THEODORE A. WETZEL
BY Cyril M. Hajewski
ATTORNEY

United States Patent Office 3,358,360
Patented Dec. 19, 1967

3,358,360
MACHINE TOOL WITH A TOOL CHANGER
Frank Zankl, Milwaukee, and Theodore A. Wetzel, Brookfield, Wis., assignors to Kearney & Trecker Corporation, West Allis, Wis., a corporation of Wisconsin
Filed Oct. 4, 1966, Ser. No. 584,261
11 Claims. (Cl. 29—568)

ABSTRACT OF THE DISCLOSURE

A tool storage magazine capable of carrying large and small diameter tools in intermixed relationship. Each storage position in which a large diameter tool is stored is preceded and followed by an empty storage position. The tools are stored in sequential order of use and each must be returned to its original storage position in the magazine. The magazine is indexed in one direction to locate the next succeeding tool in the tool change station. After the new tool has been removed from the magazine and prior to the previously used tool being placed in the magazine, the magazine is rotated in the opposite direction to locate the storage position in which the previously used tool was stored at the tool change station in position to receive the tool for storage.

---

The present invention relates generally to machine tools and more particularly to an improved machine tool provided with a plurality of different types and sizes of rotary cutting tools which may automatically be placed in a tool operating member for performing cutting operations on a workpiece.

It is a general object of the present invention to provide a machine tool with an improved tool storage and changing apparatus that will accommodate tools of varying sizes.

Another object of the invention is to provide a machine having an improved tool storage member adapted to accommodate small diameter tools and tools of relatively large diameters in intermixed relationship.

Yet another object of this invention is to provide an improved tool storage and changer mechanism which is adapted to carry in storage an intermixture of small and large diameter tools for utilization by the spindle of the machine tool and which always returns a previously used tool to its original storage position in the magazine.

According to this invention, there is provided an improved tool change mechanism for a machine tool which is equipped with a rotary spindle adapted to use diverse tools, the sizes of which vary from small diameter tools to tools having relatively large diameters. The tools are carried in storage in a circular array in a magazine and aer arranged therein in the sequence of their use in the spindle. Thus, the tools in storage are disposed in intermixed size relationship and move with the magazine in a circular path of travel for successive positioning at a tool change station. A tool change arm operably carried by the machine tool effects a simultaneous interchange of tools between the magazine and the spindle. To accommodate the large diameter tools in storage, an empty storage position is left vacant on either side of the position in which a large diameter tool is stored. Thus, a large tool carried in storage in the magazine may have a radius that is only slightly less than the spacing between centers of two adjacent storage positions.

Since small and large tools are carried in storage in the magazine in intermixed relationship in the sequential order of their use, and also since small tools are stored in adjacent storage positions and large tools are stored in positions preceded and followed by empty storage positions, magazine movement is automatically regulated to effect a positioning of the magazine to locate the original storage position in which the previously used tool was stored at the tool change station prior to the previously used tool being returned to storage to thereby insure that the sequental order of tool storage and the spacing thereof in the magazine is maintained. A relatively simple control means is provided which operates in cooperation with the electrical control circuit to effect the required regulation of magazine movement in a tool change cycle of operation, both for positioning tools at the tool change station for subsequent transfer to the spindle and also for positioning the original storage position in which the previously used tool in the spindle was stored, into the tool change station to receive its tool. In this manner, tools withdrawn from the storage magazine and used in a work operation in the spindle are always returned to the same storage position in the magazine.

FIG. 4 is a view of the magazine positioning control mechanism as viewed from the right in FIG. 3;

FIG. 5 is a fragmentary view of toolholders illustrating the difference in length of toolholder bodies to provide a means for identifying a first tool in a machining cycle relative to the other tools;

FIG. 6 is a schematic view of the hydraulic control circuit incorporated in the machine; and, FIG. 7 is a diagrammatic view of an electrical control circuit for controlling the operation of the tool change arm and the tool storage magazine.

Figure 1:
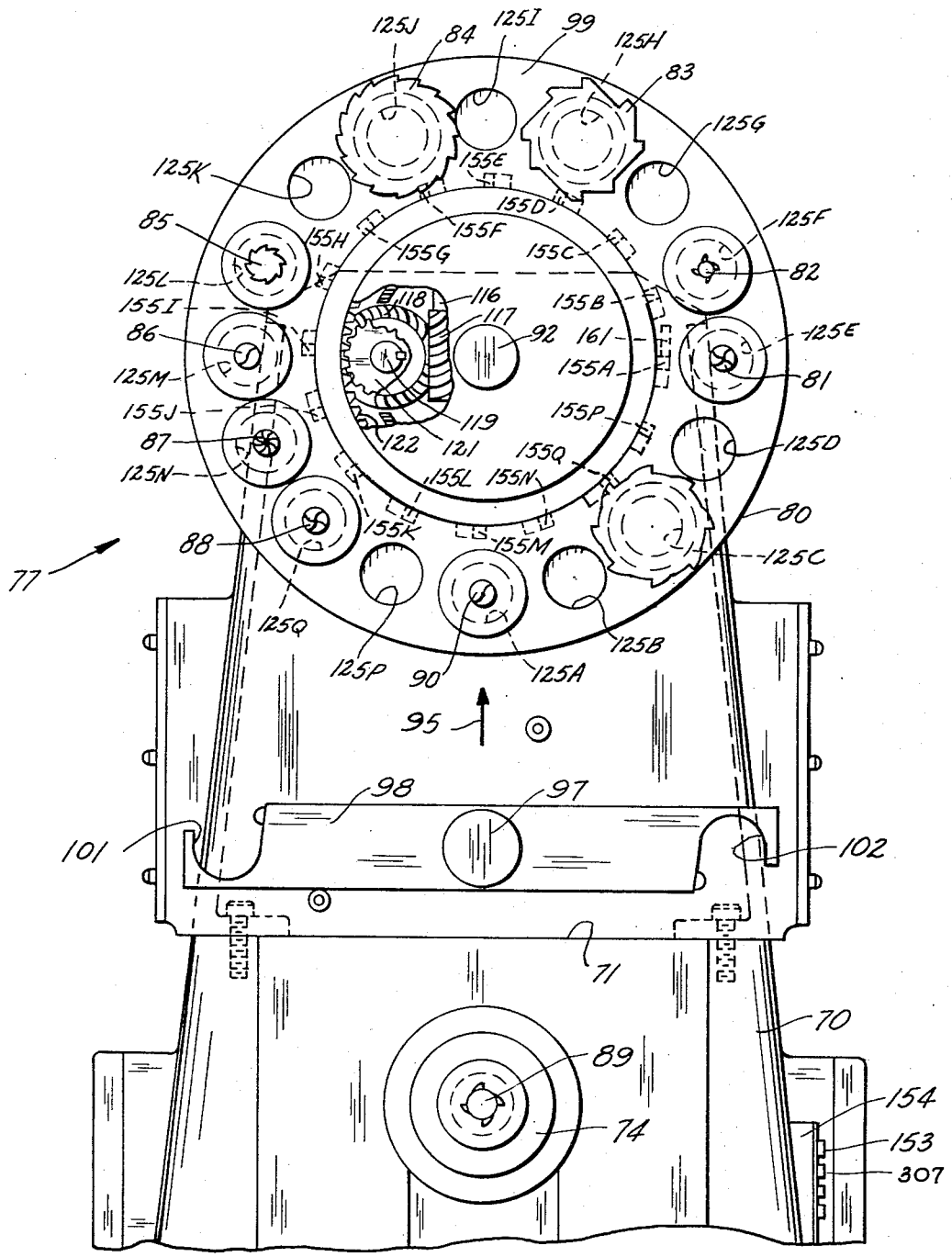
FIGURE 1 is a fragmentary front view of the upper portion of the column of a machine tool incorporating the features of the present invention and showing the tool change arm in a horizontal retracted "parked" position and the tool storage magazine.

Reference is now made more particularly to the drawings and specifically to FIG. 1 thereof which depicts a machine tool incorporating the features of the present invention. As there shown, the machine generally comprises an upstanding column 70 presenting an upper horizontal flat surface 71 on which a housing 72 is secured.

A spindle 74, which constitutes an operating station of the machine tool, is supported for rotation about a horizontal axis in the upper portion of the column 70 and is adapted to receive diverse tools for performing various machining operations. The spindle 74 is rotated by power obtained from a motor [not shown] which is connected to drive the spindle through the usual transmission [not shown] in a well-known manner.

Figures 2, 3:
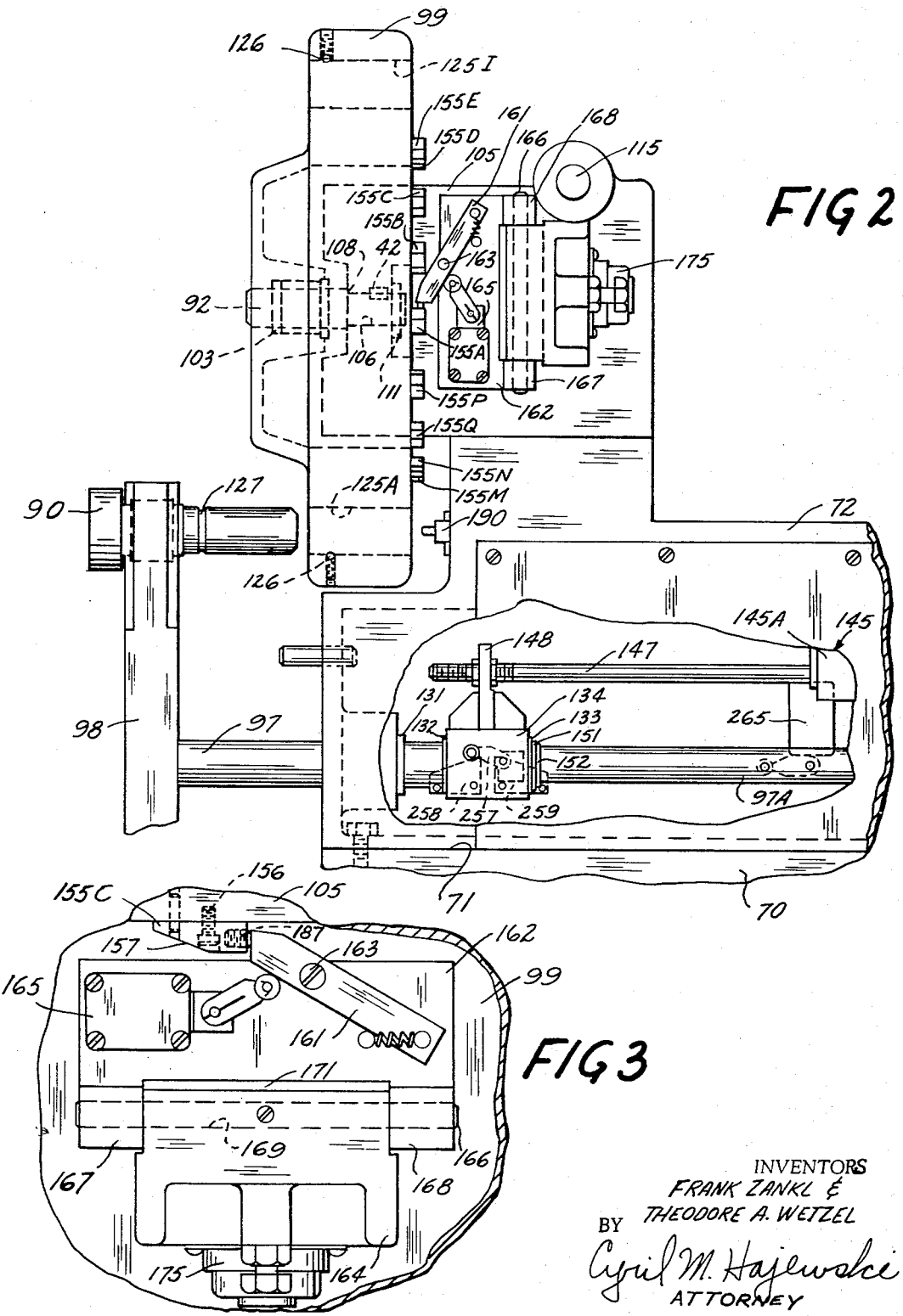
FIG. 2 is a fragmentary side view of the machine depicted in FIG. 1, showing mechanism for rotating and positioning the magazine for locating a selected tool or storage position at the tool change station and with parts broken away to show mechanism associated with the tool change arm and depicting the tool change arm in a vertical extended position.
FIG. 3 is an enlarged detailed view of the magazine positioning control mechanism depicted in FIG. 1, the mechanism being rotated 90° from the position depicted in FIG. 2.

The machine tool is equipped with an automatically operable tool changer mechanism operatively supported by the housing 72. In general, the tool change mechanism comprises a rotatable tool storage magazine 77 which is adapted to carry the plurality of diverse tools each having different cutters. The magazine 77 is supported by the housing 72 for rotation about a horizontal axis being rotatably supported on a horizontally extending shaft 92 which is carried in a forward extending semi-circular upper portion 105 of the housing 72, as depicted in FIG. 2. The magazine 77 is operable to successively locate each of the tools carried in storage therein in a tool change station 95 which is the same vertical plane that includes the axis about which the magazine 77 rotates and also the axis about which the spindle 74 rotates.

A tool change arm 98 is secured to the extending end of a shaft 97 which has its axis disposed in the same vertical plane which includes the axes of the magazine 77 and spindle 74. The shaft 97 serves to transmit both a rotary motion to the arm 98 and also to effect the extension and retraction of the arm for performing its function of withdrawing a tool from the magazine 77 and inserting it into the spindle 74 to render it operable for performing a machining operation. The tool change arm 98 is provided with grips 101 and 102 at each end thereof for engaging and holding tools in a tool interchange operation. The arm member 98 when rotated from the horizontal "parked" position depicted in FIG. 1 to a vertical position, operates to engage the grip 101 with a tool 90 located in the tool change station, and simultaneously moves the grip 102 into engagement with the cutting tool 89 carried by the spindle 74.

The tool storage magazine 77 comprises a ring member 99 which is journaled on antifriction bearings 103 that are operatively mounted on the forward extending end of the stub shaft 92, as depicted in FIG. 2. The shaft 92 is carried in the housing 72 in a horizontally disposed bore 106 that is formed in the vertical end face of the semi-circular portion 105. The shaft 92 is retained in the bore 106 by the operation of a shoulder 108 formed on the shaft and a lock nut 111 which is operably engaged on the inner extending end of the shaft 92. The arrangement is such that the shoulder 108 is in abutting engagement with one axial end face of the bore 106, while the nut is disposed in abutting engagement with the opposite axial end face of the bore. In addition, the shaft 92 is constrained against rotation by means of a key 112.

Selective movement of the magazine ring 99 in either direction is effected by the operation of a reversible hydraulic motor 115 which is secured to the upper portion 105 of the housing 72. The motor 115 is operatively connected to drive a downwardly extending shaft 116, depicted in FIG. 1, the lower end of which is provided with a worm 117. A worm gear 118 is drivingly secured on the rearward end of a horizontal shaft 119 and is disposed in constant meshing engagement with the worm 117. The shaft 119 is rotatably supported within the upper portion 105 of the housing 72 and extends forwardly into the bore of the ring 99. On its forward end, the shaft 119 is provided with a spur gear 121 which is keyed thereto so as to rotate with the shaft. The spur gear 121 is disposed in constant meshing engagement with a large internal ring gear 122 that is integrally formed on an internal surface of the magazine ring 99.

The tools are stored in individual storage positions or sockets 125 which are constructed in angular spaced apart relationship adjacent the periphery of the ring 99. Each of the sockets 125 is provided with a detent mechanism 126, FIG. 2, which is operative to engage in an annular recess 127 formed on the periphery of the shank of each of the tools when a tool is disposed within a storage socket. In this manner, inadvertent displacement of a tool from its storage position or socket is prevented but the retention force is not sufficient to prevent a withdrawal of a tool from the magazine by the operation of the tool change arm 98.

A feature of this invention is the facility of the magazine 77 to have tools of varying sizes stored therein referred to hereinafter as small and large tools. For the purpose of this description, a small tool is one in which the diameter of the cutter portion is no greater than the distance between the axial center lines of two adjacent storage sockets provided in the magazine ring 99. Such tools are represented by the particular metal removing tools 81, 82, 85 to 87, 88 and 89, and 90, inclusive, which are stored in storage sockets 125E, 125F, 125L to 125N, 125Q and 125P, and 125A, inclusive, in the magazine ring 99.

Large tools having cutter diameters that exceed the spacing between center lines of two adjacent sockets, and thus, when in storage in the magazine, would interfere with a tool in an adjacent socket. Large tools are represented by the particular tools 80, 83 and 84, stored in storage positions or sockets 125C, 125H and 125J, resepectively. Since large tools interfere with adjacent sockets, it is necessary that whenever a large tool is stored in the magazine, empty sockets must be provided on either side thereof so that there is no interference between adjacent tools upon the insertion or withdrawal of a large tool into or out of the ring 99. On the other hand, the small tools are stored in adjacent sockets as depicted by the position of the tools 85 to 89, inclusive.

As previously mentioned, the tool transfer arm 98 is carried on the outer extending end of the shaft 97 for rotation and axial movement with the shaft. As shown in FIG. 2, the shaft 97 is disposed within the lower portion of the housing 72 having its leftward end carried in a bushing 131. The portion 97A of the shaft 97, which extends rearwardly of the bushing 131, is of a reduced diameter and is provided with bearings 132 and 133 that constitute a rotatable connection to an axially movable block 134. The extreme rearward end of the reduced portion 97A of the shaft, as schematically shown in FIG. 6, is provided with external splines 136 having cooperatively sliding engagement with complementary internal splines (not shown) formed in a rotatable driving sleeve 137 that is operatively journaled in the housing 72 in axial fixed relationship therein. The drive sleeve 137 is provided with a worm gear 138 that is operatively connected to drive the sleeve 137. A worm 139 that is drivingly secured to the output shaft 141 of a hydraulic motor 142 is disposed in meshing engagement with the worm gear 138. Thus, rotational movement in either direction is imparted to the arm 98 by operation of the reversible hydraulic motor 142 operating to drive the worm 139 which, in turn, drives the worm gear 138 and thereby the drive sleeve 137. By reason of the splined driving connection between the drive sleeve 137 and the shaft 97, the rotational motion from the motor 142 is imparted to the shaft 97 and thence to the arm 98 in any axial position to which the arm 98 may be moved.

Axial movement of the arm 98 is effected by means of a hydraulic actuator 145 comprising a cylinder 145A bolted or otherwise secured within the housing 72 and a cooperating axially movable piston rod 147 which is secured to a bracket 148 integrally formed with the block 134. To move the shaft 97 and thereby arm 98 axially outward away from the front face of the machine, pressure fluid is supplied to the left end of the cylinder 145A via a line 149 which serves to effect rightward movement of the piston rod 147, as viewed in FIG. 6, or leftward movement thereof, as viewed in FIG. 2. Axial rightward movement of the piston rod 147 is transmitted to the shaft 97 from the block 134 by reason of the inner race of the bearing 132 abutting the axial face of a shoulder formed by the reduced portion 97A of the shaft 97. To provide a connection for retracting the shaft 97 and thereby the arm 98 so as to move the arm towards the face of the column 72, a thrust washer 151 is disposed in abutting engagement with the inner race of the bearing 133 and is held in such engagement by means of a snap ring 152. To retract the arm 98, pressure fluid is supplied to the right or rod end of the cylinder 145A via a connected line 237 and effects inward movement of the rod 147 thereby retracting the arm 98.

The tools are stored in intermixed relationship in the magazine ring 99 in order of their use. For this condition, it is required that there be empty storage sockets on either side of the storage socket in which a large tool is stored. Thus, it is not possible to establish a predetermined storage pattern for various groups of tools of varying numbers. In addition, and as previously mentioned, each tool must be returned to the magazine ring 99 and inserted in the storage socket in which it was originally stored. To accomplish such operation, a particular regulated indexing movement of the magazine ring 99 must be effected to obtain the desired results. An index movement of the magazine ring 99 to locate a desired tool in the tool change station 95 comprises a rotary movement of the ring 99 in a clockwise direction an angular distance equal to twice the distance between axial centers of two adjacent sockets. The indexing movement further includes a reverse movement, after the desired tool has been withdrawn from its storage position in the ring 99, in that the ring 99 is rotated in the opposite or counterclockwise direction an angular distance which is equal to the distance between the axial centers of two adjacent sockets. In other words, every indexing movement of the magazine advances the ring 99 in a clockwise direction two storage socket positions and thereafter effects a single socket positioning movement of the ring 99 in the reverse or counterclockwise direction. In this manner, tools removed from the spindle will always be returned to their original storage socket position in the ring 99. However, when a large tool is moved into the tool change station 95 it will require two indexing movements of the magazine ring 99 to effect a return of the large tool to its original storage position in the magazine and to provide the spindle with a tool for performing a work operation.

For the purpose of clearly showing the regulated controlled movement of the ring 99 in effecting a tool interchange of both large and small tools, several tool change cycles of operation will be described. For this purpose, it will be assumed that the ring 99 has been previously indexed to position the next succeeding tool 90 to be utilized in the spindle 74 at the tool change station 95. With the above assumed condition established, a tool change cycle of operation is initiated manually by the operator momentarily depressing a cycle start switch button 153 which is operatively contained in a control box 154 located at the right side of the machine on the column 70. With the cycle start button 153 depressed, the tool change arm 98 is operated and rotates in the clockwise direction from its "parked" position, shown in FIG. 1, to a vertical tool engaged position wherein the grip 101 engages the tool 90 in the magazine and the grip 102 engages the tool 89 in the spindle 74. Thereafter, the arm is moved axially outwardly to withdraw the tools and then rotated in a clockwise direction 180° to interchange the position of the tools. When the extended arm 98 has been rotated 90° of the 180° interchange movement, the magazine ring 99 is operated in a counterclockwise direction, one socket spacing, to locate the empty storage socket 125P at the tool change station 95 in position to receive the previously used tool 89. As mentioned, the socket 125P is the socket in which the tool 89 had been originally stored. With the empty storage socket 125P in the tool change station 95, rotation of the arm 98 in a clockwise direction continues to position the arm in an interchange position wherein the new tool 90 carried by the grip 101 is positioned in axial alignment with the spindle 74 while the previously used tool 89 in the grip 102 is positioned in axial alignment with its original storage socket 125P. The arm 98 is now retracted, inserting the tool 89 in the storage socket 125P and the tool 90 in the spindle 74, respectively. Thereafter, the arm 98 is rotated in a counterclockwise direction to its "parked" position. With the arm 98 returned to its "parked" position, rotation of the ring 99 in a clockwise direction is again initiated and it will move two storage socket spacings thereby moving the empty storage socket 125B into the tool change station 95. With the empty socket 125B positioned at the tool change station 95, a tool change cycle of operation has been completed.

After the spindle has completed the work operation with the tool 90, a second tool change cycle of operation will be initiated and the arm 98 will again rotate in a clockwise direction from its "parked" position into a vertical tool engaging position wherein the grip 101 will engage the tool 90 in the spindle 74. Since the empty storage socket 125B is positioned at the tool change station 95, there is no tool presented for the grip 102 to engage. The arm now is operated to withdraw the tool 90 from the spindle and thereafter rotate 180° in a clockwise direction to the vertical tool interchange position. When the arm 90 has been rotated 90° of the 180° of tool interchange movement, rotation of the ring 99 in a counterclockwise direction one socket spacing is again initiated so as to position the socket 125A in the tool change position. The socket 125A is the socket in which the tool 90 was originally stored.

As the magazine ring 99 rotates to position the storage socket 125A in the tool change station 95, the rotation of the arm 98 in a counterclockwise direction is continued, moving it into a vertical tool interchange position wherein the grip 101 positions the tool 90 in axial alignment with the storage socket 125A in the ring 99. The arm is then retracted inwardly to insert the tool 90 into its original storage socket 125A and, thereafter, rotated in a counterclockwise direction to its "parked" position. With the arm returned to its "parked" position, rotation of the ring 99 in a clockwise direction is again initiated and this movement of the ring 99 will position the socket 125C in which the large tool 80 is stored in the tool change position.

Since the spindle 74 does not have a tool, the operator will immediately initiate another tool change cycle so that the arm 98 is operated in a tool change cycle of operation as previously described. In this cycle of operation, the magazine ring 99 will be rotated in a counterclockwise direction one socket spacing to locate the socket 125B in the tool change station 95, and the arm 88 will complete the tool change operation by inserting the tool 80 in the spindle 74 and thereafter return to its retracted horizontal "parked" position.

With the return of the arm 98 to its horizontal "parked" position, rotation of the magazine ring 99 in a clockwise direction is again initated and it rotates two socket spacings, moving the now empty socket 125D into the tool change station 95. With this positioning movement of the ring 99, a tool change cycle of operation has been completed, and after the spindle 74 has completed a work operation with the tool 80, the operator will again initiate a tool interchange cycle. The arm 98 will again operate, moving from its "parked" position to a vertical tool engaging position wherein it grips the tool 80 that is in the spindle, and since in this cycle of operation, the socket 125D is in the change station 95, there is no tool presented for the opposite grip of the arm 98 to engage.

The arm will be operated in its tool change cycle withdrawing the tool 80 from the spindle 74 and the magazine ring 99 will again be rotated in a counterclockwise direction one socket position thereby positioning the socket 125C in the tool change station 95 in position to receive the tool 80. Thereafter, the arm 98 is moved to its "parked" position.

With the arm returned to the "parked" position, rotation of the ring 99 in a clockwise direction is again initiated so that it again moves two socket spacings wherein the storage socket 125E with the tool 81 is moved into the tool change station. Since the previous operation of the tool change arm did not withdraw a tool from the magazine and insert it in the spindle, the spindle is now empty and therefore the operator must initiate another tool change cycle so as to provide the spindle with a tool. Thus, the operator will actuate the cycle start button 153 to initiate the operation of the arm 98 to withdraw the tool 81 from its storage socket 125E and insert it into the spindle 74. In this cycle of operation, the magazine ring 99 will be rotated in a counterclockwise direction one socket spacing to position the socket 125D in the tool change station. After the arm completes its operation of inserting the tool 81 into the spindle 74 and after it has returned to the horizontal "parked" position, rotation of the ring 99 in a clockwise direction is again initiated and it moves two socket spacings to position the socket 125F with the tool 82 in the tool change station 98.

From the foregoing description of the several tool changing operating cycles it is apparent that a novel arrangement has been conceived whereby the versatility and useability of a machine tool incorporating automatic tool changing mechanism has been increased by providing for the intermixed storage of both large and small tools. The novel arrangement does not require that the tools be coded, nor are the storage positions coded. Thus the need for relatively expensive code readers and the usual reading and memory circuits, as well as coding structure such as rings or keys for either the tools or the sockets has been eliminated.

The tool storage ring 99 is rotatably driven by the motor 115 in a clockwise direction, as viewed from the front of the machine, with precise positioning of the particular socket being effected by a counterclockwise movement of the ring 99. To accurately position each storage position of the magazine in the tool change station 95, the ring 99 is provided with a plurality of annularly spaced cams 155, each of which is secured in circular array to the rear surface of the ring by means of a bolt 156, as shown in FIG. 3. The cams 155 are carried in bodily spaced relationship to each other and each cam is located in predetermined position relative to an associated bored tool receiving opening or socket 125. As the ring 90 is rotated in an indexing movement in a clockwise direction, a bevel surface 157 presented by a cam 155 engages a spring biased lever 161 that is pivotally secured to a bracket 162 by means of a flanged pivot pin 163, FIGS. 2 and 3. The bracket 162, in turn, is carried for pivotal movement on a bracket 164 that is secured to the housing 105. Pivotal movement of the bracket 162 in a counterclockwise direction, as viewed in FIG. 4, serves to move both the lever 161 and a reverse control switch 165 inwardly towards the housing portions 105 and out of the path of travel of the cams 155 as they move with the ring 99. In FIG. 3, the bracket 162 with the associated mechanism therein has been rotated 90° in a clockwise direction from the showing made of the bracket as it appears in FIG. 2.

The bracket 162 is supported for pivotal movement on the fixed bracket 164 by means of a pivot pin 166 which is disposed in axially aligned bores formed in a pair of lugs or ears 167 and 168 integrally formed with the bracket 162. The pivot pin 166 passes through a bore 169 formed in a tongue 171 of the fixed bracket 164 that projects between the ears 167 and 168 of the bracket 162. The fixed bracket 164 is provided with a flanged inner end 172, FIG. 4, through which bolts 173 pass and engage in suitable threaded openings provided in the upper portion 105 of the housing 72. Pivotal movement of the bracket 162 in a counterclockwise direction, as viewed in FIG. 4, for moving the lever 161 and the switch 165 out of the path of travel of the cams 155 is accomplished by the operation of a solenoid 175. To this end, the solenoid 175 is provided with an axially movable plunger 176, the outwardly extending end of which is arranged to pass through an enlarged opening 177 formed in the extreme outer end of a laterally inwardly extending arm member 178 that is integrally formed with the bracket 162. An operative connection between the plunger 176 and the arm 178 is effected by means of a self-adjusting washer 179 having a concave surface that mates with the convex surface formed on the end of the arm 178 and which are maintained in operative relationship by means of a nut 181. Whenever the coil of the solenoid 175 is energized, the plunger is moved downwardly, and by operation of the washer and nut connection and the lever arm 178, effects the pivotal movement of the bracket 162 about the pin 166 in a clockwise direction, as viewed in FIG. 4. As a result, the lever 161 and switch 165 moving with the bracket 162 are moved out of the path of travel of the cams 155. On the other hand, to effect a pivotal movement of the bracket 162 in a counterclockwise direction to return the lever 161 and switch 165 to their normal operating positions that they occupy as depicted in FIG. 4, the coil of the solenoid 175 is deenergized. With the solenoid 175 deenergized, a spring 184 that is operatively supported in interposed relationship between the fixed bracket 164 and the arm 178 is operative to effect a pivotal movement of the bracket 162 in a counterclockwise direction thereby returning the lever 161 to its normal operating position.

Except when positioning the first tool of a group of tools at the tool change station 95, the movement of the ring 99 is in a predetermined cycle with each cycle of movement serving to position a succeeding tool storage socket at the tool change station 95 and returning the preceding tool storage socket to the tool change station 95. As the ring 99 is moved two positions in a clockwise direction, as viewed from the front of the machine, the bevel surface of one of the cams 155 engages the lever 161 to pivot the lever in a counterclockwise direction, as viewed in FIGS. 2 or 3. The pivotal movement of the lever 161 in a counterclockwise direction will serve to move it downwardly to engage and actuate the switch 165 which is also secured to the bracket 162. Thus, as a cam 155 moving with the ring 99 engages the lever 161 it effects the pivotal movement of the lever which, in turn, actuates the reverse control switch 165. With the electrical system properly conditioned, as will hereinafter be more fully described, the second actuation of the reverse control switch 165 effects the final counterclockwise position movement of the ring 99 for positioning the next socket in the tool change station 95. As the ring 99 rotates in a counterclockwise direction, the cam that had previously effected the second actuation of the lever 161, such as the cam 155A, will be moved into abutting engagement with the end of the lever 161 which is resiliently retained in its stop position. Each of the cams 155 is provided with an adjustable set screw 187, FIG. 3, which may be adjusted so that an exact position of a storage socket at the tool change station 95 will be accomplished. The screws 187 in each of the cams 155 are adjusted so that the outer projecting end of each screw is tangent to a radial line that passes through the axis of the magazine ring 99 and also through a storage socket with which a cam is associated. Also the lever 161 is supported and arranged on the bracket 162 in a manner that the stop end surface thereof is normally disposed to be engaged by a cam 155 whenever a storage socket is positioned at the tool change station 95. However, it is to be understood that the above-stated arrangement is the preferred arrangement and other arrangements may be made if so desired. The requirement being that whenever a cam 155 is moved into abutting engagement with the stop end of the lever 161, a storage socket must then be positioned in the tool change station 95.

A feature of this invention is the simplified index control system for the storage ring wherein it is possible to position storage sockets in successive order at the tool change station and return the preceding storage sockets to the tool change station. To accomplish this, the first tool of a group of tools required for maching a particular workpiece is provided with identifying means. Thus, when storing tools in the storage ring 99, a first tool such as the tool 80 is first inserted into a storage socket of the ring 99. Thereafter, the remaining tools of the group are manually inserted in the remaining empty storage sockets moving in a counterclockwise direction and in the sequence of their required use. In initially inserting the tools in the magazine, attention will be given to the requirement that large tools, such as the tools 80, 83 and 84, must always be preceded and followed by an empty storage socket. With the tools loaded in the storage ring as described, it will be apparent that clockwise rotation of the ring 99 will advance the respective tools into the tool change station 95 in the order of their required use.

Identification for a first tool is provided by attaching an extension 189 to the non-operating or shank end of the tool so that it will have a greater length relative to the length of the other tools. The difference in length of a first tool and another tool is depicted in FIG. 5 with respect to the tools 80 and 90. As shown, the tool 80 is the first tool in a matchining cycle and, as such, is identified by being provided with the shank extension 189 which is removably attached to it. With the extension 189 attached, the tool 80 has a greater length by an amount "X" than the tool 90. Because of its greater length, the tool 80 actuates a first tool identifying switch 190 as the tool is moved into the tool change station 95. To secure the limit switch 190 in an operative position to be actuated by a first tool, the switch is fastened to the front face of the housing 72. The switch 190 is disposed thereon in a manner that its actuating plunger is behind and slightly to the right of a storage socket that is located at the tool change station 95, as depicted in FIG. 1. In this manner, a first tool will actuate the switch 190 slightly before it is moved into the tool change station 95. Thus, the first tool will actuate the identifying switch 190 prior to the reverse control switch 165 being actuated. This is true, because the angle subtended by a line constructed tangent to the stop end of the lever 161 and passing through the axis of the ring 99 and a line passing through the axis of the switch 190 and also passing through the axis of the ring 99 is less than the angle subtended by the aforementioned tangent line and a vertical line passing through the tool change station 95 and the axis of the ring 99.

The reverse control switch 165 is not operable even though actuated to stop the clockwise movement of the ring 99 until such time as a first tool switch 190, shown in FIGS. 1 and 2, is activated by a first tool. Thus, if it is assumed that the ring 99 is being rotated in a clockwise direction, as viewed from the front of the machine, to position the first tool 80 into the first tool change station 95, the storage socket 125B will be moved into the station 95 first. As the socket 125B is moved into the tool change station 95 the cam 155B, FIG. 2, will be moved into position to engage and pivot the lever 161 in a counterclockwise direction thereby actuating the reverse control switch 165. However, since the first tool switch 190 has not as yet been actuated, the electrical circuit has not been conditioned to render the reverse control switch operable. Therefore, the ring 99 will continue to rotate in a clockwise direction moving the first tool 80 into the tool change station 95. The first tool 80 will now actuate the switch 190 and it operates to condition the reverse control circuit for operation upon the subsequent actuation of the switch 165. At this time, the cam 155C, which will control the reverse movement of the ring 99 to effect first positioning of the tool 80 in the tool change station, is not as yet in position to actuate the lever 161. After the first tool 80 has actuated the switch 190, the ring 99 will continue to rotate moving the axis of the first tool 80 slightly past the center line of the station 95. However, the shank of the first tool will still be in engagement with the switch 190 to retain it actuated. At this time, the cam 155C will have been moved into a position to actuate the lever 161 and thereby the switch 165. Upon being actuated, the switch 165, in cooperation with the actuated switch 190, operates to effect the rotation of the ring 99 in a counterclockwise direction. The movement of the ring 99 in a counterclockwise direction will move the cam 155C into abutting engagement with the stop end of the lever 161 thereby effecting the precise positioning of the tool 80 in the tool change station 95. After the first tool switch 190 has been actuated and the first tool located in the tool change station 95, the reverse control switch 165 will operate to control the movement of the storage ring 99 in its subsequent positioning movements until all of the remaining tools of a group have been positioned at the tool change station 95.

The hydraulic circuit for operating the various components of the machine tool described above is illustrated diagrammatically in FIG. 6 and comprises a pump 211 connected to draw fluid from a reservoir 212 through a conduit 213 and to discharge the fluid under pressure into a main supply conduit or line 214. The usual pressure relief valve 216 is connected in parallel with the pump 211 and operates to by-pass fluid back to the reservoir to prevent an excessive increase in pressure in the system.

To illustrate the operation of the hydraulic circuit, a tool interchange cycle will be described and it will be assumed that a machining operation with the tool 89 has just been completed and that the spindle 74 is still rotating. It will be further assumed that the tool storage ring 99 has been moved so as to position the next tool 90 to be utilized in the spindle in the tool change station 95. With the tool storage ring 99 positioned to present the next tool 90 in the tool change station 95, the ring 99 is urged in a counterclockwise direction so as to obtain the final positioning of the tool. Thus, the cam 155A, FIG. 2, is in abutting engagement with the end of the stop lever 161. This counterclockwise directional urge, which is imparted to the ring 99, is maintain during a tool change cycle as well as during a machining operation and the ring 99 is only moved in a clockwise direction when it is moved to locate another storage socket at the tool change station 95. To urge the ring 99 in a counterclockwise direction, a solenoid 221 associated with the control valve 222 is normally deenergized. With the solenoid 221 deenergized, the valve 222 is operated to connect a branch supply line 223 to a line 224 which, in turn, is connected to a port of the motor 115. Fluid pressure supplied to the motor 115 via the line 224 normally operates to effect the operation of the motor for urging the ring 99 in a counterclockwise direction. At this time, exhaust fluid from the opposite port of the motor 115 flows into the line 225 and by operation of the valve 222 is directed into a return branch line 226 which is connected to the main return line 227 that leads to the reservoir 212. The rate of flow of the exhaust fluid in the line 226 is controlled by a flow control valve 228 which is operable to control the rate of rotation of the ring 99.

Upon a signal, which may be obtained either manually or automatically from a control programmed source that calls for a change of tools, mechanism 230 associated with spindle 74 and which includes a collet actuator 230A, a spindle clutch mechanism 230B and a spindle brake mechanism 230C is actuated to stop spindle rotation, disconnect the drive to the spindle and to effect the release of the tool holding collet in a well-known manner. The operation of the spindle mechanism 230 is controlled by means of the solenoid valve 231 which is operated by means of associated solenoid 232. With the solenoid 232 energized, the valve 231 is operated to direct fluid pressure from the supply line 214 into a connected line 233 which, in turn, is connected to the spindle mechanism 230. The fluid pressure supplied to the spindle mechanism 230 via the line 233 will actuate the brake mechanism to stop spindle rotation as well as to release the spindle drive mechanism and to actuate the collet to release a tool in the spindle. On the other hand, when the solenoid 232 is deenergized, the valve 231 will be returned to its normal position wherein the fluid pressure from the line 214 to the valve is blocked and the line 233 is connected to the main return line 227 thereby releasing the spindle brake 230C reengaging the spindle clutch mechanism 230B and effecting a clamping action of the collet mechanism 230A.

After the rotation of the spindle 74 has been stopped, the tool change arm 98 is rotated from its horizontal "parked" position, depicted in FIG. 1 90° in a clockwise direction to a vertical tool engaging position, as depicted in FIG. 2, wherein the grip 101 engages the tool 90 and the grip 102 engages the tool 89 in the spindle 74. During this initial rotary movement of the arm 98, the arm is retained in a retracted position and a cam 259, FIG. 6, is in position to actuate a switch 265. To retain the arm 98 in retracted position, a solenoid 234 associated with a valve 235 is energized so that the valve is operated to connect a branch supply line 236 to a line 237 which has its opposite ends connected to the rod end of the actuator 145. Thus, fluid pressure supplied to the actuator 145 via the line 237 maintains the rod 147 and thereby the arm 98 in a retracted position.

With the arm 98 in a retracted position, the rotary movement of the arm in a clockwise direction from its horizontal "parked" position to a tool engaging vertical position is effected by the operation of a valve 240. The valve 240 is operable to supply fluid pressure to the hydraulic motor 142 for effecting its operation in either direction for rotating the arm 98 either in a clockwise or a counterclockwise direction. To effect the clockwise rotary movement of the arm 98, a solenoid 241 associated with the valve is energized thereby effecting the operation of the valve for directing fluid pressure from a branch supply line 242 into a line 243 which is connected to a port of the motor 142. With fluid pressure supplied to the motor 142 via the line 243, the motor operates to effect the clockwise rotational movement of the arm 98. Exhaust fluid from the motor 142 will flow into a line 244 and by operation of the valve 240 will be directed into a return line 246 with the return fluid flowing through a flow control valve 247 which is set to regulate the rate of flow of the exhaust fluid thereby establishing the rate at which the arm 98 is rotated.

When the tool change arm 98 has been rotated to a vertical position, depicted in FIGS. 2 and 6, a cam 248, shown as being carried on the drive sleeve 137, will be moved into the position shown in FIG. 6 to actuate a limit switch 250. Actuation of the switch 250 will affect the deenergization of the solenoid 241 so that the valve 240 is returned to its neutral position to thereby stop the rotation of the arm 98.

With the arm 98 rotated from the "parked" position into vertical tool engaging position where it has gripped the tools 90 and 89 in the magazine and spindle, respectively, the tools will be withdrawn from the magazine and the spindle by the axial outward movement of the arm 98 away from the front face of the column of the machine to a fully extended position, as depicted in FIG. 2. Axial outward movement of the arm 98 is effected when a solenoid 251 associated with the valve 235 is energized to thereby effect the operation of the valve to direct fluid pressure from the branch supply line 236 into the line 149. Fluid pressure supplied to the line 149 and thence to the actuator 145 will effect the axial rightward movement of the piston rod 147 relative to the actuator, as viewed in FIG. 6, or to the left, as viewed in FIG. 2. Simultaneously therewith, the opposite end of the actuator 145 is connected to the reservoir via the line 237 and by operation of the valve 235 to a return line 254, the exhaust fluid flowing through a flow control valve 256 which operates to regulate the rate of return fluid flow and thereby the rate of axial movement of the arm 98.

With the arm in a fully extended position, having the tools 89 and 90 gripped therein, an interchange in the positions of the tools will be effected by rotating the arm 98 180° in a clockwise direction so that the position of the tools are reversed wherein the tool 90 will be positioned in axial alignment with the spindle 74 while the tool 89 will be positioned in axail alignment with a storage socket of the ring 99. To impart a tool interchange rotational movement to the arm 98, the solenoid 241 is again energized. The reenergization of the solenoid 241 is effected by the actuation of the limit switch 257 which is accomplished by means of a cam 258, FIGS. 2 and 6, carried on the shaft 97A and which is moved into position to actuate the switch 257 when the arm 98 is moved to its extended position. Thus, with the solenoid 241 again energized, the valve will once more be operated to effect the operation of the motor 142 for effecting the clockwise rotational movement of the arm 98, as previously described.

When the arm 98 has been rotated 90° of the total 180° of interchange movement and is in an extended position, a cam 261 shown diagrammatically in FIG. 6 as being carried on the periphery of the drive sleeve 137 will have been rotated into position to actuate a switch 262. As indicated in FIG. 6, another cam 263, which is complementary to the cam 261, also carried on the periphery of the drive sleeve 137 but spaced thereon diametrically opposite from the cam 261. The cams 261 and 263 are shown in the positions that they occupy when the arm 98 is in a vertical position. Thus, when the arm is rotated from a horizonal "parked" position to a vertical position depicted in FIG. 6, both of the cams will be in the same horizontal plane. Thereafter, as the arm 98 is rotated from a vertical extended position to a horizontal extended position, the cams 261 and 263 will again be positioned in a vertical plane wherein the cam 261 is moved into engagement with the switch 262 to actuate it. It will be understood that on an alternate cycle or next cycle of operation, the cam 263 will effect the actuation of the limit switch 262.

The actuation of the limit switch 262 will effect energization of the solenoid 175 which, in turn, will effect the pivotal movement of the bracket 162 about the pin 166 in a clockwise direction, as viewed in FIG. 4, thereby moving the stop lever 161 out of engagement with the cam 155A to release the ring 99. As previously mentioned, the ring is constantly urged in a counterclockwise direction and, therefore, when the lever 161 is moved out of engagement with the cam 155A, the ring 99 will be released and will move in a counterclockwise direction. The stop lever 161 is maintained clear of the path of travel of the cams 155 only sufficiently long enough so as to allow the cam 155A to move past the normal operative stop position of the lever 161. Thereafter, the solenoid 175 is deenergized and the bracket 162 is pivoted in a counterclockwise direction about the pin 166 by operation of the spring 182 to return the lever 161 into the path of travel of the cam 155. Thus, as the ring 99 rotates in the counterclockwise direction, the cam 155P, FIG. 2, will move into engagement with the stop end of the lever 161 thereby stopping the counterclockwise rotation of the ring 99 locating the empty storage socket 125P in the tool change station 95 in position to receive the tool 89. The socket 125P of the ring 99, which is now located in the change station 95 to receive the tool 89, is the same socket in which the tool 89 was originally stored.

As the magazine ring 99 is rotating to position the storage socket 125P in the tool change station, the solenoid 241 of the valve 240 is maintained energized so that the motor 142 continues to drive the arm 98 in a clockwise direction to complete the full 180° rotational tool interchange movement of the arm.

With the arm 98 rotated 180° in a tool interchange positioning movement, a cam 249, FIG. 6, carried on the periphery of the sleeve 137 diametrically opposite the cam 248 will have been positioned so that it actuates the switch 250. The actuated limit switch 250 will effect the deenergization of the solenoid 241 associated with the valve 240 so that the valve operates to interrupt the supply of fluid pressure to the motor 142 thereby stopping the rotation of the arm 98. With the arm 98 rotated 180°, the tool 90 that was previously in the magazine ring 99 is now positioned so that it can be inserted into the spindle 74 and the tool 89 that was withdrawn from the spindle 74 is in position to be inserted into the tool storage socket 125P of the ring 99 by the retraction of the arm 98.

To retract the arm 98 for inserting the tools in the magazine and spindle as described, the solenoid 234 is energized, and simultaneously therewith, the solenoid 251 is deenergized. The energization and deenergization of the solenoids 234 and 251 is effected by the actuation of the switch 250. The energized solenoid 234 effects the operation of the valve 235 for directing fluid pressure into the line 237 so that it is supplied to the rod end of the actuator 145 thereby effecting the axial inward movement of the rod 147 moving the arm 98 inwardly towards the column 70 in a retracting movement.

As the arm 98 retracts the cam 258, FIG. 2, is moved out of engagement with the actuating arm of the limit switch 257. Upon completion of the retraction movement, a cam 259, FIGS. 2 and 6, is moved into position to actuate a limit switch 265 thereby providing a signal to indicate that the tools have been inserted into the magazine and the spindle. With the limit switch 265 actuated, rotation of the arm 98 in a counterclockwise direction is initiated, disengaging the grips from the tools and rotating the arm 98 to its horizontal "parked" position. During this rotational movement of the arm 98, the solenoid 234 is maintained energized so that the arm 98 is positively retained in retracted position while it is being rotated to its "parked" position.

To rotate the arm 98 in a counterclockwise direction from the retracted vertical position to a retracted horizontal "parked" position, the solenoid 241 which has been previously deenergized is maintained deenergized, while the solenoid 266 associated with the valve 240 is energized. Energization of the solenoid 266 effects the operation of the control valve 240 whereby fluid pressure from the supply line 242 is directed into the line 244 thereby effecting the operation of the motor 142 for driving the arm 98 in a counterclockwise direction to its horizontal "parked" position. With the arm in its horizontal "parked" position, the cam 261 rotating with the drive sleeve 137 will be in a position to actuate the limit switch 262 thereby effecting the deenergization of the solenoid 266. Thus, the valve 240 operates to return to its neutral position wherein it blocks the flow of fluid pressure to the motor 142.

With the tool change arm 98 returned to the horizontal "parked" position thereby actuating the switch 262, a movement of the ring 98 of the tool storage magazine 77 in a clockwise direction is initiated. As previously mentioned, movement of the ring 99 in a clockwise direction is such as to move the ring 99 through an angular distance which is equal to twice the angular distance between two adjacent storage sockets. It will also be recalled that the last movement of the tool storage magazine ring 99 was in a counterclockwise direction and served to position the storage socket 125P at the tool change station 95 in position to have the tool 89 inserted therein. Thus, the movement of the ring 99 in a clockwise direction two storage socket spacings will move the empty storage socket 125B into position at the tool change station 95. Therefore, upon a subsequent movement of the ring 99 in a counterclockwise direction one storage socket spacing, as previously described, will serve to position the now empty storage socket 125A at the tool change station 95 in a position to receive the tool 90 from the spindle so that the tool is returned to the socket in which it was originally stored.

As previously mentioned, movement of the storage socket ring 99 in a clockwise direction is initiated by the actuation of the switch 262. Actuation of the switch 262 effects the energization of the solenoid 221 associated with the magazine motor control valve 222. With the solenoid 221 energized, the valve is operated to direct fluid pressure to the magazine motor 115 to effect its operation in a direction to drive the storage ring 99 in a clockwise direction, as viewed from the front of the machine in FIG. 1. Since the movement of the storage ring 99 in a clockwise direction is initiated from a position wherein the storage socket 125P is in the tool change station 95 and the cam 155P is in engagement with the end of the stop lever 161, the cam 155A moving with the ring 99 will engage the stop lever 161 pivoting it in a counterclockwise direction, as viewed in FIGS. 2 and 3, as the now empty storage socket 125A is moved into the tool change station 95. Counterclockwise pivotal movement of the stop lever 161 will operate to actuate the reverse control switch 165. However, the first actuation of the reverse control switch 165 has no effect and the magazine motor 115 will continue to drive the ring 99 in a clockwise direction. When the ring 99 has been rotated in a clockwise direction sufficiently far enough to position the empty storage socket 125B in the tool change station 95, the socket 125B being the socket which was positioned two spaces to the right of the tool change station 95 when this movement of the ring 99 was initiated, the cam 155B will be moved into position to actuate the stop lever 161 and thereby the switch 165 a second time. With the reverse control switch 165 actuated a second time, it will operate to effect deenergization of the solenoid 221. With the solenoid 221 deenergized, the valve 222 is operated to stop the operation of the motor 115 to stop the clockwise rotational movement of the ring 99 and initiate motor operation in a direction to urge the ring 99 in a counterclockwise direction. With the ring 99 urged in a counterclockwise direction. the cam 155B is moved into engagement with the stop end of the lever 161 thereby effecting the final precise positioning of the storage socket 125B in the tool change station 95. With the storage socket 125B positioned in the tool change station 95, a tool change cycle of operation has been completed.

With the above-described tool change cycle completed it will be apparent that to position the next succeeding tool 80, which is to be utilized in the spindle 74 in the tool change station 95 will required two tool change cycles of operation. This is true because the tool 80 is a large tool and is preceded by the empty storage socket 125B which is now positioned in the tool change station 95. Therefore, the initiation of the next tool change cycle of operation will serve to operate the arm 98 to withdraw the tool 90 from the spindle 74, rotate the ring 99 in a counterclockwise direction one socket spacing to locate the storage socket 125A in the tool change station 95, in position to receive the tool 90 from the arm; operate the arm to insert the tool 90 in its original storage socket 125A; and thereafter, move the magazine ring 99 in a clockwise direction two storage socket spacings to locate the socket 125C with the succeeding tool 80 at the tool change station 95. This single cycle of operation will position the next tool 80 in the change station 95 and it will be necessary to initiate another tool change cycle of operation to effect the transfer of the tool 80 to the operating spindle 74.

When another tool change cycle of operation has been completed to transfer the tool 80 to the spindle, the magazine ring 99 will have been operated so that the empty storage socket 125D is located at the tool change station 95. Thus, when a work operation with the tool 80 has been completed, the next tool change cycle of operation will only effect the return of the tool 80 to its original storage socket 125C and this cycle will end with the ring 99 being positioned so as to locate the next storage socket 125E with the next succeeding tool 81 in the tool change station 95. At this time, the spindle 74 will not have a tool since the previous tool change cycle of operation only returned the tool 80 to its original storage socket 125C. Therefore, to provide the spindle 74 with the next succeeding tool 81, another cycle of operation must be initiated.

From the foregoing, it will be apparent that if a work operation or a sequence of work operations are such as to require only small tools, these tools will be stored in succeeding adjacent sockets and every tool change cycle with the exception of the first tool of the group will serve to effect a simultaneous interchange of tools between the spindle and the magazine. However, with the present invention, whenever it is necessary that large tools be intermixed with small tools in a group, the storage magazine need not be modified to accommodate such an intermixture of tools. It is also apparent that when an intermixture of large and small tools are used in a work operation, it is not necessary that the large tool be inserted into the spindle manually nor that the magazine be provided with a dummy tool to indicate the sequence of the large tool in the order of tool use. The present invention operates in a predetermined manner, regardless of whether or not the magazine has all small tools, all large tools, or an intermixture of both large and small tools, and the tools need not be coded, nor is it necessary that the large sockets be coded.

*Electrical circuit*

The electrical control circuit for controlling the operation of the machine in a tool change cycle of operation is shown in the wiring diagram illustrated in FIG. 7. In this diagram, each of the electrical components is shown connected in horizontal conductors or lines that are, in turn, connected across vertical power lines P1 and P2. Each of the horizontal lines is identified successively by numerals 10 to 36, inclusive, so that individual components in the various lines may be readily located. The contacts of the various relays and switches are identified by the same reference numerals as their associated relay coils or switches with a numeral suffix added for the purpose of distinguishing each individual contact from the other.

In describing the operation of the electrical control circuit, certain initial conditions will be assumed to best illustrate the various features of the invention. Thus, it will be assumed that a new machining cycle is to initiated and that the first tool of the group of tools to be used in the next machining cycle is the first tool 80 and it is not located in the tool change station 95 but is stored in the socket 125C which is two positions to the right of the tool change station 95 as viewed from the front of the machine in FIG. 1. It will be further assumed that the spindle 74 does not contain a tool, that the tool change arm 98 is in its horizontal retracted "parked" position. Under the assumed conditions the switches 250 and 257 will be deactuated, a switch 265 will be actuated by a cam 259, and the switch 262 will be actuated by the cam 261.

A tool change cycle of operation for effecting the selection and insertion of a first tool, such as the tool 80 into the spindle 74, can be initiated either automatically by a signal obtained from a record, or the machine operator can initiate a tool change cycle manually. If the machine is under automatic control, various automatic contacts 301, 302, 303 and 304 in lines 16, 25, 32 and 35, respectively, will be operated to closed positions in proper sequence to initiate a tool change cycle of operation. However, with the machine under manual control, a tool change cycle of operation for the first tool 80 is initiated by the machine operator momentarily depressing a first tool pushbutton switch 307, line 17. With the first tool switch 307 depressed, an associated contact bar 307–1, line 34, is moved to a closed position. With the contact bar 307–1 in a closed position, a circuit is completed from the power line P1 via line 34, vertical line 308, to horizontal line 40, and thence to the power line P2 to energize the solenoid 232 associated with a spindle mechanism control valve 231. The energized solenoid 232 effects the operation of the valve 231 to direct pressure fluid to the spindle brake mechanism 230C, the spindle clutch mechanism 230B, and the collet mechanism 230A, to thereby apply a brake to the spindle, disconnect the drive thereto and release the collet. Simultaneously another contact 307–2, line 17, is also moved to a closed position and operates to complete a circuit along line 17 to energize a coil of a relay 310. With the coil of the relay 310 energized, associated normally open contacts 310–1 to 310–4 in lines 36, 16, 15 and 13 are moved to closed positions. With the contact 310–1 closed, a holding circuit is completed from the power line P1 via line 36, vertical line 308, to line 31, and thence to power line P2, to maintain the solenoid 232 energized upon the subsequent release of the first tool pushbutton switch 307. A holding circuit to retain the coil of the relay 310 energized is also established via two parallel circuits which are completed along horizontal lines 14 and 15 through now closed contacts 310–3 and 310–2 in lines 15 and 16, respectively. These parallel maintaining circuits are completed to horizontal line 17 via an interconnected vertical conductor 312. Simultaneously, a circuit is also established to energize a coil of the interlock relay 315 in line 12 which serves to prevent other components from functioning inadvertently. This circuit is completed from the power line P1 along horizontal line 14 through the now closed contact 165–1 of the deactuated reverse control switch 165 to a vertical line 316. From the vertical line 316, the circuit continues to horizontal line 13, through the now closed contact 310–4, through a vertical line 317 to horizontal line 12 and thence through the coil of the relay 315 to power line P2. With the relay 315 energized, it operates to move its associated contact bars from their normal positions that they occupy, as shown in FIG. 7, to their alternate positions. Thus, a contact bar 315–1 in line 10 is moved to a closed position and operates to complete a circuit to energize the solenoid 221 that is associated with the magazine control valve 222. This circuit is established from the energized vertical line 317 leftwardly along line 12 through a normally closed contact 320–4 of a deenergized relay 320. The circuit continues through the closed contact 320–1 through a connecting conductor 321 which is connected to line 10. The circuit then continues rightwardly along line 10 through the now closed contact 315–1 and thence to the coil of the solenoid 221 to energize the solenoid. With the solenoid 221 energized, the valve 222 is operated to direct pressure fluid to the magazine motor 115 for effecting its operation to drive the magazine socket ring 99 in a clockwise direction. The ring 99 will continue to rotate in a clockwise direction until such time as the first tool 80 actuates the first tool switch 190. Thus, since the socket 125C in which the first tool 80 is stored is located two positions to the right of the tool change station 95, the magazine ring 99 will rotate in a clockwise direction thereby moving the empty socket 125B through the station 95. As the socket 125B moves through the station 95, the cam 155B moving with the ring 99 will actuate the lever 161 which, in turn, actuates the reverse control switch 165. However, since the first tool switch 190 has not as yet been actuated, the actuation of the switch 165 has no effect on the control system at this time. Rotation of the magazine ring 99 in a clockwise direction continues until the first tool actuates the switch 190. With the first tool 80 moved into the tool change station 95, the limit switch 190 shown in line 15 will be actuated to an open position thereby interrupting one of the two parallel holding circuits which were previously established for maintaining the coil of the relay 310 energized. Slightly after the first tool 80 actuates the switch 190 and while it is still retained actuated, the cam 155C that is associated with the storage socket 125C will be moved into position to actuate the lever 161, and thereby actuate the reverse control switch 165. Thus, with both the first tool switch 190 and the reverse control switch 165 actuated, both of the holding circuits for retaining the coil of the relay 310 energized are interrupted and the relay is deenergized. With the relay 310 deenergized, its contacts are all returned to the normal position as shown in FIG. 7. Therefore, the contact 310–4 in line 13 is moved to an open position and operates to interrupt the energizing circuit to the coil of the relay 315 and it is deenergized. As a result, its associated contact 315–1 in line 10 is moved to its open position thereby effecting the deenergization of the solenoid 221 associated with the valve 222. Thereupon, the valve 222 operates to reverse the internal valve connections so that pressure fluid is now directed to the opposite side of the motor 115 for effecting its operation in the opposite direction to drive the magazine ring 99 in a counterclockwise direction. The magazine will rotate in a counterclockwise direction until the cam 155C abuts the stop end of the lever 161, which operates to prevent further counterclockwise rotation of the magazine 99. On this occurrence, the socket 125C with the first tool 80 is positioned at the tool change station 95 in position so that the tool 80 may be engaged by the tool change arm 98.

The first tool 80 is now located in tool change station 95 in position to be subsequently transferred to the spindle 74. This is accomplished by means of the operator actuating a pushbutton switch 153. With the pushbutton switch 153 actuated, its associated contact 153–1 in line 31 is moved to a closed position. This serves to establish a circuit along line 31 to again energize the solenoid 232 associated with the spindle control valve 231. As previously described, with the solenoid 232 energized, the valve 231 is operated to effect the operation of the spindle brake mechanism, the drive mechanism, and the collet associated with the spindle mechanism 230. Simultaneously, with the movement of the contact 153–1 to a closed position, an associated contact 153–2 in line 26 is also moved to a closed position. With the contact 153–2 in a closed position, a circuit is established on the power line P1 along line 26 to horizontal line 27 and thence rightwardly along line 27 through a normally closed contact 250–1 of the arm vertical switch 250. The circuit continues along line 27 through the normally closed contact 325–1 of a deenergized relay 325 and through the normally closed contact 315–2 of deenergized relay 315 to the solenoid 241 associated with the arm rotation control valve 240. With the solenoid 241 energized, the valve 240 is operated to direct pressure fluid to the motor 142 to effect its operation for driving the arm 98 in a clockwise direction as viewed in FIG. 1 thereby moving it from its horizontal parked position to a vertical tool engaging position. Simultaneously, with the energization of the solenoid 241, a circuit is also completed to effect the energization of the relay 320 in line 25. This circuit is completed from horizontal line 26 to line 25 via an interconnecting line 323 and thence through the relay coil and a now closed contact 315–4 of the deenergized relay 315 to the power line P2. The energized relay 320 operates to move its associated contacts 320–4 and 320–1 in lines 12 and 17, respectively, to open position. This action serves to prevent the energization of the relays 315 and 310, lines 12 and 17 respectively. As a result, all contacts associated with the relay 315 are retained in their normal positions. Thus, the contact 315–1 in line 10 will be open thereby effectively preventing the energization of the solenoid 221, so that the ring 99 will be continued to be urged in a counterclockwise direction against the position stop lever 161. Also a normally open contact 320–2 in line 33 is moved to closed position to complete a holding circuit for maintaining the solenoid 232 energized so that the mechanism 230 is maintained operable to apply a brake to the spindle, deactuate the associated clutch mechanism, and release the collet. As the arm 98 is rotated from its horizontal "parked" position towards a vertical tool engaging position, the switch 262 is released so that its associated contact bars 262–1 and 262–2 in lines 18 and 27, respectively, are moved to open and closed positions, respectively. A holding circuit along line 27 is now completed through the now closed contact 320–3 of the energized relay 320, the now closed contact 262–2 of the switch 262, through conductor wire 323 and thence through the coil of the relay 320 to the energized power line P2. Thus, as soon as the arm 98 starts to rotate, the pushbutton switch 153 may be released without interrupting the operation of the tool change cycle.

With the arm 98 rotated to a vertical tool engaging position, the switch 250 will be actuated by the cam 248 as previously described. With the switch 250 actuated, its associated contact 250–1 in line 27 is moved to an open position and interrupts the circuit along line 27 to effect the deenergization of the solenoid 241. The valve 240 will now operate to block the flow of pressure fluid to the motor 142 thereby stopping the clockwise rotation of the arm 98 with the arm being positioned in a vertical plane wherein its grip 101 is in engagement with the first tool 80.

With the switch 250 actuated, its associated normally open contact 250–2 in line 20 is moved to a closed position. On this occurrence a circuit along line 20 is completed to energize the solenoid 251 associated with the control valve 235 via a connected vertical line 324 to line 21 and thence through the now closed contact 257–1 of deactuated arm out switch 257 and now closed contacts 325–2 and 315–7 of deenergized relays 325 and 315, respectively. The energized solenoid 251 effects the operation of the valve 235 to direct pressure fluid to the actuator 145 to operate the actuator in a direction to effect outward movement of the arm 98 thereby withdrawing the first tool 80 from its storage socket 125C. As soon as the arm 98 starts to move outwardly, the cam 259 is moved out of engagement with the limit switch 265 thereby releasing the switch so that its contact 265–1 in line 21 is moved to a closed position. However, this has no effect on the control circuit at this time. Outward movement of the arm 98 will continue until such time as the cam 258 engages and actuates the switch 257. When this occurs, the switch will be actuated so that its contact bars 257–1 line 21 and 257–2 line 20 are moved to open and closed positions respectively. With the contact 257–1 in line 21 moved to an open position it will operate to interrupt the circuit along line 21 to effect the deenergization of the solenoid 251 associated with the valve 235. Thereupon, the valve is operated to interrupt the flow of fluid pressure to the actuator 145 stopping arm outward movement.

With the tool change arm 98 in full extended position and with the arm out switch 257 actuated, a circuit will be completed along line 20 through the now closed contact 250–2, the now closed contact 257–2, to line 19. The circuit continues along line 19 to the vertical line 327 and thence to line 22 and through the coil of the relay 330 and the normally closed contact 315–9 of deenergized relay 315 to the power line P2 to energize the relay 330. With the relay 330 energized, it operates to move an associated normally open contact 330–1 in line 21 to a closed position to complete a maintaining circuit from line 20 through a connected line 328, now closed contacts 330–1 and 265–1 to line 327 and thence to and through line 22 for retaining the coil of the relay 330 energized. The energized relay 330 also operates to actuate a pair of associated contacts 330–2 and 330–3 in lines 29 and 28 respectively. However, the contact 330–2 in line 29 is a normally open time delay to close contact, while the contact 330–3 in line 26 is normally closed time to open contact. Therefore, after a slight delay, the normally open time to close contact 330–2 in line 29 will move to a closed position completing a circuit from the power line P1, along line 30 to a vertical connected line 329 and through the now closed contact 330–2 to line 28. The circuit continues on through the still closed normally closed time to open contact 330–3 in line 28 and along line 28 to a connected vertical line 331. The circuit continues on through line 331 to horizontal line 27 and thence rightwardly along line 27 through a normally closed time to close contact 325–1 of the deenergized relay 325 and through a normally closed contact 315–2 of deenergized relay 315 through the solenoid 241 to the power line P2. With the solenoid 241 energized it operates the arm rotation control valve 240 to direct pressure fluid to the actuator 142 for effecting rotation of the arm 98 in a clockwise direction. As soon as the arm 98 begins its clockwise rotation from a vertical position, the switch 250 is released so that its associated contact 250–1 in line 27 is moved to a closed position. This will complete a circuit along line 27 from the power line P1 through the now closed contact 320–3 of the previously energized relay 320, through the now closed contact 262–2 of the released arm horizontal switch 262, through the now closed contact 250–1 of the switch 250 and thence through contacts 325–1 and 315–2 in line 27 to the solenoid 241 to maintain the solenoid energized upon the subsequent movement of the normally closed time to open contact 330–3 in line 28 to an open position.

After the arm 98, carrying the first tool 80 in its grip 101, has rotated from the vertical position to a horizontal position in a clockwise direction, the cam 261, FIGS. 6 and 7, rotating with the sleeve 137 will be moved into position to actuate the switch 262. The actuation of the switch 262 has no effect on the control circuit at this time because the relay 320 line 25 is maintained energized through the now closed contact 250–1 of the arm vertical switch 250. The circuit is established from the vertical interconnecting line 331 leftwardly along line 27, through the now closed contact 250–1 to vertical line 332, thence along line 26 to and through vertical line 332, line 26 to line 25, and thence through the coil of the relay 320. The vertical line 331 is maintained energized at this time because the contact 330–3 in line 28 associated with the relay 330, is a normally closed time to open contact and its timer mechanism is set so that the time delay setting thereof will expire after the arm 98 has rotated more than 90° from its vertical position. Thus, when the arm 98 has been rotated past a horizontal position, the switch 262 will be released and its associated contact 262–2 in line 27 will return to a closed position. Thus, a maintaining circuit is completed from the power line P1 along line 27 through closed contacts 320–3 and 262–2 to vertical line 332 and thence through the balance of the preceding circuit, as previously described, to maintain the relay 320 energized upon the movement of the contact 330–3 to an open position.

The momentary actuation of the switch 262 by the cam 261, that occurs when the arm 98 is moved to a horizontal position, actuated the switch to move associated contact 262–1 in line 18 momentarily to a closed position. The moment of the contact 262–1 to a closed position completes a circuit which is established from horizontal line 20 through connected vertical line 328 to horizontal line 21. The circuit continues through the now closed contact 330–1 of the energized relay 330, the now closed contact 265–1 of the arm "in" switch 265, to vertical line 327 and thence via horizontal line 18 through the now closed contacts 262–1 and 315–1 through the solenoid 175 to power line P2, thereby energizing the solenoid 175. Energization of the solenoid 175 effects the pivotal movement of the bracket 162, FIGS. 2 and 4, inwardly towards the housing 105 or rightwardly, as viewed in FIG. 4, thereby disengaging the stop lever 161 from the cam 155C. Since the ring 99 is constantly urged in a counterclockwise direction, as viewed in FIG. 1, the retraction of the lever 161 out of engagement with the cam 155C will release the magazine ring 99 so that it will rotate in a counterclockwise direction. However, the energization of the solenoid 175 is only momentarily sufficiently long enough to insure that the cam 155C has moved beyond the end of the stop lever 161. At that time, the solenoid is deenergized and a spring 184, FIG. 4, becomes operative to return the bracket and thereby the stop lever 161 to its normal operating position, wherein the end of the lever 161 is again interposed in the path of travel of the cams 155. Thus, as the magazine continues in its counterclockwise urging, the next cam 155B will engage the end of the stop lever 161 thereby stopping the movement of the magazine ring 99. Under this condition, the empty storage socket 125B will now be located in the tool change station 95. The deenergization of the solenoid 175 occurs by reason of the fact that the switch 262 is only actuated momentarily by means of the cam 261 when the arm 98 has rotated 90° from its vertical tool engaging position and as it continues to rotate the cam moves out of engagement with the switch 262 thereby releasing it so that the contact 262–1 is returned to its normal open position. This, of course, will interrupt the circuit along line 18 to effect the deenergization of the solenoid 175 and the spring 184 will operate to return the bracket 162 to its normal position.

The arm 98 continues to rotate in a clockwise direction even though the normally closed time to open contact 330–3 in line 28 has now moved to an open position. This is true because a circuit is now established from the power line P1 along line 27 by reason of the fact that the contact 262–2 in line 27 has again been returned to a closed position. It will be recalled that when the arm 98 has been rotated 90° from the vertical position, the cam 261 actuated the switch thereby moving the contact 262–2 to an open position. However, upon the subsequent further rotation of the arm 98 in a clockwise direction, the cam 261 moves out of position and releases the switch 262 so that the contact 262–2 is returned to its normal closed position. As a result, a maintaining circuit is completed from line 27 to retain the solenoid 241 associated with the valve 240 energized thereby retaining the actuator 142 operative for rotating the arm in a clockwise direction. The arm 98 will continue to rotate in a clockwise direction until it is again in a vertical position. At this time, the cam 249, shown in FIG. 6 as carried on the periphery of the sleeve 137 diametrically opposite the cam 248, is moved into position to move its associated normally open contacts 250–2 and 250–3 in lines 20 and 23, respectively, to closed position, and simultaneously therewith, to move its normally closed contact 250–1 in line 27 to an open position. The contact 250–1, upon being moved to an open position, interrupts the energizing circuit established along line 27 for energizing the solenoid 241 so that the solenoid is deenergized and the valve 240 is returned to its central neutral position. With the valve 240 returned to its central neutral position, the supply of fluid pressure to the actuator 142 is interrupted to thereby terminate rotation of the arm.

With the arm in vertical position, the tool 80 will be positioned in axial alignment with the spindle 74 in position to be inserted therein. Retraction of the arm 98 to insert the first tool 80 into the spindle 74 is initiated by the actuation of the switch 250 which moved its associated contact 250–3 in line 23 to a closed position. Simultaneously, with the movement of the contact 250–3 to a closed position, the associated contact 250–2 in line 20 is also moved to a closed position but has no effect because the normally closed time to close contact 325–2 in line 21 is in open position. This is true, because when the contact 250–3 is moved to a closed position, the relay 325 in line 24 will be energized and operates to move its associated contact 235–2 in line 21 to an open position. Thus, with the switch 250 actuated, the relay 325 is energized and operates to effect the deenergization of the arm out solenoid 251, and simultaneously therewith, the arm in solenoid 234 is also energized. The circuit for energizing the relay 325 and the solenoid 234 is completed from the power line P1 along line 27 through the now closed contacts 320–2 and 262–2 to vertical line 332. The energizing circuit continues from the vertical line 332 along horizontal line 26 to and through the vertical line 323 to line 23 and thence along line 23 through the now closed contact 330–4, which is normally open time delay to closed contact that is set to expire simultaneously with the arm 98 reaching the vertical position. Thus, the contact 330–4, line 23, is now closed and the circuit continues along line 23 and through the now closed contact 250–3 and the normally closed contact 315–5 to and through the coil of the solenoid 234 to the power line P2 energizing the solenoid 234. Simultaneously with the energization of the solenoid 234, the coil of the relay 325 is also energized via a parallel circuit of line 24. With the solenoid 234 energized, the valve 235 is operated so that it directs fluid pressure to the rod end of the actuator 145 effecting inward retracting movement of the arm 98. As the arm 98 moves inwardly to insert the tool 80 into the spindle 74, the cam 258, FIG. 6, is moved out of engagement with the switch 257 thereby releasing the switch so that the contacts associated with the switch are returned to there normal positions, as shown in FIG. 7. This has no effect on the control circuit at this time.

When the arm 98 is fully retracted thereby inserting the tool into operating position within the spindle 74, the cam 259, FIG. 6, will be moved into position to actuate the switch 265. With the switch 265 actuated, its associated contact 265–1 in line 21 is moved to an open position thereby interrupting the circuit along line 21 to effect the deenergization of the coil of the relay 330. Deenergization of the coil of the relay 330 occurs at this time because subsequent to this upon the start of inward movement of the arm, the switch 257 was released so that the contact 257–2, line 20, was moved to an open position thereby interrupting the circuit on line 20 so that this parallel circuit is no longer effective to energize the coil of the relay. With the relay 330 deenergized, the contact 330–4 in line 23 associated with the relay will immediately move to an open position. This effectively interrupts the circuit along line 23 so that both the arm in solenoid 234 associated with the valve 235 and the coil of the relay 325 are deenergized. With the relay 325 deenergized, the timing mechanism associated with all the time delay contacts that are associated with the relay 325 will start to operate. Thus, the normally closed time to close contact 325–1 in line 27 is in an open position, having been previously actuated to that position upon the energization of its associated relay coil 325, and will now remain open until the time delay period set for it to close has expired. As a result, the circuit along line 27 is effectively interrupted so that the arm counterclockwise solenoid 266 is maintained deenergized. Similarly, the normally open time to open contacts 325–3 and 325–4, in lines 28 and 29, respectively, are closed and remain closed until their time delay settings expire. Thus, an energizing circuit to the solenoid 266 is now complete so that the arm 98 will be rotated in a counterclockwise direction from a retracted vertical position to its "parked" position.

The solenoid 266 energizing circuit is completed from the power line P1 along horizontal line 30, through the closed contact 325–5 to line 29. The circuit continues through the normally open time to open contact 325–4 in line 29, to line 28 and thence rightwardly through the normally open time to open contact 325–3 now closed, and the closed contact 315–3 to the solenoid 266. With the solenoid 266 energized, the valve 240 is operated to direct fluid pressure to the actuator 142 to rotate the arm 98 in a counterclockwise direction from the vertical position to its horizontal parked position.

It will be recalled, that with the arm 98 in a vertical position, the switch 250 is actuated. As a result, its associated contact 250–1 in line 27 is in an open position. Therefore, as the arm 98 is rotated in a counterclockwise direction, the cam 249 will be moved out of engagement with the switch 250 thereby releasing the switch. As a result, its associated contact 250–1 in line 27 is moved to a closed position. With the contact 250–1 in a closed position a circuit is completed from the power line P2 along line 27 through the now closed contacts 320–3, 262–2 and 250–1 to the vertical line 331. The circuit continues from the vertical line 331 to line 28 and thence along line 28 through the now closed normally open time to open contact 325–3 and the now closed contact 315–3 to the solenoid 266. Thus, the arm counterclockwise solenoid is maintained energized after the time delay setting of the normally open time to open contact 325–4 in line 29 expires and the contact moves to open its position. At this time, delay setting for the normally open time to close contact 325–3, line 28, is still running and the contact remains in a closed position. Thus, the arm counterclockwise solenoid 266 is maintained energized through the maintaining circuit established along line 27.

With the arm 98 returned to its horizontal "parked" position, the cam 263, shown in FIG. 6, will be moved into position to actuate the switch 262, thereby moving the associated contact 262–2, in line 27, to an open position. As previously mentioned, prior to the movement of the contact 262–2 to an open position, the normally open time to open contact 325–4 in line 29 moved to its normally open position because its time delay setting had expired and the parallel circuit for maintaining the solenoid 266 energized from the line 30 is interrupted. Therefore, upon the actuation of the switch 262 thereby moving the contact 262–2 to open position, the circuit long line 27 is interrupted and power to both the solenoid 266 and 241 is effectively interrupted so that both of these solenoids are deenergized and the valve 240 returns to its central neutral position. Thereafter, the time interval set for all the time delay contacts associated with the relay 325 expires so that all contacts associated with he relay 325 are reurned to their normal positions and conditioned for the next cycle of operation.

As previously mentioned, the coil of the relay 320, line 25, had been maintained energized through a circuit established from line 27 via the holding contact 320–3 and contact 262–2. Thus, when the contact 262–2 associated with the switch 262 is moved to an open position, the maintaining circuit is interrupted and the relay 320 is deenergized. The deenergized relay 320 operates to move its associated contact 320–1 in line 17 to its normally closed position as indicated in FIG. 7. However, an associated normally open time to open contact 320–5 in line 10 will be retained closed until the setting of an assoicated timer mechanism expires allowing the contact to move to its normal open position. Thus, at this time, a circuit is established from the power line P1 along line 10 through the now closed normally open time to open contact 320–5 to the connected conductor 321 and thence to line 12. The circuit continues through the now closed contact 320–4 and thence through the coil of the relay 315 to the power line P2. This circuit will energize the coil of the relay 315 and it will operate to move its associated contact 315–1 in line 10 to a closed position. Since the setting for the time delay mechanism associated with the contact 320–5 in line 10 has not as yet expired, a circuit along line 10 is completed to energize the solenoid 21 associated with the magazine control valve 222. The valve 222 operates to direct fluid pressure to the motor 115 for effecting the clockwise rotation of the ring 99. To maintain both the relay 315 and the solenoid 221 energized upon the subsequent movement of the contact 320–5 to its open position, a maintaining circuit is now completed via a now closed contact 315–10 in line 14 associated with the energized relay 315. Such circuit will be via the line 14 through the now closed contact 165–1 of the switch 165, through the now closed contact 315–10 to horizontal line 13 and vertical line 31 to horizontal line 12. The circuit then splits rightwardly along line 12 to the coil of the relay 315 to maintain it energized; and, leftwardly along line 12 through the now closed contact 320–4 to and through line 321 to horizontal line 10 and thence through the now closed contact 315–1 to the solenoid 221. Thus, the magazine ring 99 will continue to be rotated in a clockwise direction.

It will be recalled that upon the initiation of the clockwise directional rotation of the ring 99, the condition was such that the empty socket 125B was located in the tool change station. Therefore, when the ring 99 is rotated in a clockwise direction, and it will continue to do so, moving the storage socket 125C in which the large tool 80 was stored through and past the tool change station 95 to locate the empty socket 125D in the tool change station. This is true because at this time the normally open time to open contact 320–5, line 10, associated with the now deenergized relay 320 is still in a closed position since the setting of its time delay mechanism has not expired. Thus, the solenoid 221 is maintained energized even though the cam 155C, which is associated with the socket 125C, is moved past and actuates the lever 161 thereby actuating the switch 165. The first actuation of the switch 165 has no effect on the control system at this time since, as mentioned above, the solenoid 221 is maintained energized through the contact 320–5 in line 10. The ring 99 continues to rotate until the cam 155D engages the lever 161 thereby actuating the switch 165 a second time moving the contact 165–1 in line 14 to an open position and effecting the deenergization of the solenoid 221 to terminate clockwise rotation of the ring 99. This is true, because subsequent to the actuation of the lever 161 by the cam 155D, the time interval set for maintaining the contact 320–5 in a closed position will have expired and the contact will move to its normal open position. Therefore, the maintaining circuit along line 10 which had been established for maintaining the solenoid 221 energized is interrupted, and therefore, when the switch 165 is actuated by the cam 155D, the circuit along line 14 will also be interrupted so that the solenoid 221 is deenergized. Simultaneously with the deenergization of the solenoid 221, the coil of the relay 315 is also deenergized so that its associated contacts are all returned to their normal positions, as depicted in FIG. 7.

With the solenoid 221 deenergized, the control valve 222 operates to direct the pressure fluid to the motor 115 for effecting its operation to urge the drum in the counter-clockwise direction. The drum will be urged in a counter-clockwise direction only as far as the lever 161 permits such rotation and the rotation of the magazine in the counterclockwise direction will stop when the cam 155D engages the end of the stop lever 161. Thus, at this time, the empty socket 125D will be in the tool change station 95.

After a work operation has been completed with the tool 80, a tool change cycle will again be initiated, either automatically through the actuation of the automatic contact 302 in line 25, or manually by the machine operator depressing the pushbutton switch 153 line 26, to effect the cycle of operation as described. As will be recalled, actuation of the pushbutton switch effects the clockwise rotation of the arm 98 from its horizontal "parked" position to a vertical position. Since the empty socket 125D is now in the tool change station there will be no tool for the grip 102 of the arm 98 to engage with. However, the grip 101 will move into engagement with the large first tool 80 in the spindle 74. Thereafter in sequential order, the arm moves outwardly to extract the tool 80 from the spindle, starts a clockwise rotation from a vertical position in a clockwise direction, and when it completes a quarter turn and is in a horizontal position, the solenoid 175 will be energized to effect the pivotal movement of the bracket 162 to thereby move the lever 161 out of engagement with the cam 155C to release the ring 99 so that it will be rotated in a counterclockwise direction one socket spacing. This movement of the ring 99 will serve to position the empty socket 125C, in which the first tool 80 was originally stored, in the tool change station 95. When the magazine has rotated to locate the socket 125C in the tool change station 95, rotation of the ring will be interrupted. The arm will continue to rotate in a clockwise direction so as to move the tool 80 into axial alignment with the socket 125C. With the arm returned to a vertical position, the arm will be moved inwardly to insert the tool 80 into the socket 125C in which it was originally stored. Thereafter, the arm 98 will be rotated in a counterclockwise direction to its horizontal "parked" position. The ring 99 will thereafter be rotated in a clockwise direction two socket positions so as to locate the socket 125E with the tool 81 in the tool change station 95. At this time, the spindle 74 does not have a tool, and to transfer the tool 81 to the spindle, it will be necessary to initiate another tool change cycle by which may be accomplished, either automatically through the actuation of the automatic contact 302, or manually by depressing the switch button 153, another cycle of operation as described.

It is apparent, that to transfer a large tool from the magazine to the spindle and back into the original storage socket in the magazine will require two tool change cycles of operation. This is necessary because of the fact that a large tool is preceded and followed by empty storage sockets. However, in the case of small tools which are stored in succeeding adjacent sockets each tool change cycle of operation will effect an interchange of tools, i.e., replacing previously used tool in the spindle with a new tool from the magazine while it returns the previously used tool to the storage socket in which it was originally stored.

From the foregoing detailed description of the illustrative embodiment of the invention set forth herein to exemplify the present invention, it will be apparent that there has been provided an improved tool change mechanism in combination with a novel tool storage means in which large diameter tools and small diameter tools may be stored in intermixed relationship and the tools are always returned to the original sockets in which they were originally stored.

Although the illustrative embodiment of the invention has been described in considerable detail for the purpose of disclosing a practical operative structure, whereby the invention may be practiced advantageously, it is to be understood that the particular apparatus described is intended to be illustrative only and that the various novel characteristics of the invention may be incorporated in other structural forms without departing from the spirit and scope of the invention, as described in the sub-joined claims.

The principles of this invention having now been fully explained in connection with the foregoing description, we hereby claim as our invention:

1. In a tool change mechanism for a machine tool having a tool operator and a tool change station;
   a movable tool storage magazine having a plurality of storage positions in which tools are removably stored in the order of utilization in the tool operator;
   a tool transfer member operable to transfer a tool from a storage position of the magazine located at the tool change station to the tool operator and to transfer the previously used tool from the tool operator to a storage position of said magazine located at the tool change station;
   means to effect the movement of said magazine in a first direction an angular distance equal to twice the distance between two adjacent storage positions, said means being also operable in response to the operation of said transfer member operating in a tool change cycle of operation to effect the movement of said magazine in a second direction an angular distance equal to the spacing between adjacent storage positions prior to said transfer member completing its cycle of movement;
   whereby the movement of said magazine in the first direction will position a storage position with a succeeding tool to be used in the tool operator at the tool change station and the movement in the second direction will serve to position an empty storage position in which the tool in the tool operator had been stored at the tool change station so that the tool withdrawn from the tool operator will be returned to its original storage position in said magazine by said tool operator.

2. In a tool change mechanism according to claim 1 wherein said means to effect the movement of said magazine includes a sensing means operable to maintain said magazine moving in the first direction, said sensing means being also operable upon sensing the positioning of a first tool to be utilized in the tool operator at the tool change station to stop the movement of said magazine irrespective of the angular distance that the magazine has moved.

3. In a tool change mechanism according to claim 1 wherein said magazine is provided with large and small tools which are stored in intermixed relationship in the order of their utilization in the tool operator; and,
 the storage position in which a large tool is stored is preceded and followed by empty storage positions and said small tools are stored in adjacent storage positions.

4. In a tool change mechanism according to claim 1 wherein said means to effect the movement of said magazine normally operates to urge said magazine in the second direction; and,
 there is provided a positive stop means normally operable to prevent the movement of said magazine in the second direction, said positive stop means being movable to an inoperative position to release said magazine so that said magazine will move in the second direction an angular distance equal to the distance between two adjacent storage positions.

5. In a machine tool according to claim 4 wherein said positive stop is provided with an actuator operable to effect the movement of said positive stop to an inoperative position to release said magazine in response to the movement of said tool transfer member in a tool transfer operation to a position intermediate said tool change station and said tool operator, said magazine thereupon being moved in its second direction an angular distance equal to the spacing between two adjacent storage positions.

6. In a machine tool according to claim 5 wherein said means to effect the movement of said magazine includes a reversible power actuator connected to drive said magazine in either direction selectively; and,
 there is provided a control means operable to effect the operation of said power actuator for driving said magazine in a first direction, said control means including means responsive to the movement of said magazine in the first direction an angular distance equal to twice the distance between two adjacent storage positions to reverse the operation of said power actuator, and said positive stop means operates to limit the movement of said magazine in the second direction to precisely position a storage socket at the tool change station, said control means further including means to initiate the operation of said tool transfer member in a tool interchange operation.

7. In a machine tool according to claim 6 wherein said positive stop comprises a pivotal lever biased to a stop position to be selectively engaged by any one of a plurality of cam members carried by said magazine as said magazine is urged in the second direction, each of said cam members being associated with a particular storage position, whereby the engagement effected between a cam member and the positive stop lever upon the movement of said magazine in the second direction serves to precisely position the storage position of the magazine with which the cam member is associated at the tool change station.

8. In a machine tool according to claim 7 wherein said stop lever is carried on a bracket that is supported for movement between a normal position and a retracted position, said bracket when in a retracted position operating to move said stop lever out of engagement with a cam member to thereby release said magazine so that the magazine power actuator will move said magazine in a second direction;
 a power actuator for said bracket and operable to move said bracket to its retracted position, said bracket power actuator operating in response to the movement of said tool transfer member to a position intermediate of said tool change station and said tool operator in a tool transfer operation, said bracket power actuator being retained operative sufficiently long enough to allow the cam member which had been in engagement with said stop lever to be moved past said stop lever; and,
 means operable to return said bracket to its normal position wherein said stop lever is imposed in the path of travel of said cam members to thereby stop the movement of said magazine in the second direction after it has moved an angular distance equal to the spacing between two adjacent storage positions.

9. In a machine tool according to claim 6 wherein there is provided a plurality of cam members carried by said magazine, said cam members being associated with individual storage positions of said magazine; and,
 means to reverse the operation of said magazine power actuator includes a switch operable upon a double actuation thereof to effect the reversal in the operation of said magazine power actuator so that said magazine is urged in a second direction, said switch being disposed in position to be actuated by said cam members as they move in their path with said magazine in the first direction.

10. In a machine tool according to claim 1 wherein said means to effect the movement of said magazine and said transfer member includes a reversible power means connected to rotate said magazine in either direction;
 means to sense the positioning of the first tool in said magazine to be utilized in the spindle at the tool change station;
 control means operable to initiate the operation of said power means for rotating said magazine in one direction, said control means being responsive to said sensing means to terminate the operation of said power means and stop the rotation of said magazine with the first tool being located at the tool change station;
 tool transfer means carried by the machine and operable to transfer a tool located at the tool change station from said magazine to said spindle;
 second means to initiate the operation of said tool transfer means in a tool change cycle of operation;
 third means responsive to the operation of said tool transfer means in a tool change cycle of operation to effect the operation of said control means to initiate the operation of said power means for rotating said magazine in a second direction one socket spacing prior to said transfer means completing a tool transfer movement;
 fourth means responsive to said transfer means completing a tool transfer cycle of operation to effect the operation of said control means to operate said power means to move said transfer member to an inoperative position; and,
 fifth means responsive to the movement of said transfer means to an inoperative position to effect the operation of said control means to initiate the operation of said power means to move said magazine in the one direction to advance said magazine two socket spacings.

11. In a machine tool having a frame and a tool change station;
 a tool receiving spindle rotatably supported in said frame;
 a tool storage magazine rotatably supported on said frame;
 a plurality of tool storage sockets in said magazine;
 a group of tools to be utilized by said spindle in a work operation removably disposed in said sockets in an irregular socket pattern but in the sequential order in which they will be used;
 a tool transfer member supported by said frame and operable to transfer a tool from a magazine socket positioned at the tool change station to said spindle;

power means connected to effect the operation of said magazine and said transfer member in a tool positioning and transfer operation;

a first control means operable to initiate the operation of said power means for rotating said magazine in a first direction for locating a storage socket with the first tool to be utilized in said spindle at the tool change station; and, a second control means operable to effect the operation of said power to operate said transfer member and said magazine in a sequential cycle wherein said transfer member is operated to remove the tool from the storage socket located at the tool change station and transfer the tool to said spindle and said magazine is rotated in a second direction one storage socket spacing prior to said transfer member completing its tool transfer movement, and thence said transfer member after it has completed a tool transfer movement is operated to an inoperative position and thereafter said magazine is rotated in the first direction two storage socket spacings.

No references cited.

RICHARD H. EANES, JR., *Primary Examiner.*